(12) United States Patent
Wada (10) Patent No.: US 6,170,468 B1
(45) Date of Patent: Jan. 9, 2001

(54) FUEL INJECTION CONTROL SYSTEM FOR INTERNAL COMBUSTION ENGINE

(75) Inventor: Shuichi Wada, Hyogo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/552,308

(22) Filed: Apr. 19, 2000

(30) Foreign Application Priority Data

Oct. 18, 1999 (JP) .................................................. 11-295219

(51) Int. Cl.$^7$ .................................................. F02M 51/00
(52) U.S. Cl. .......................................... 123/476; 123/478
(58) Field of Search ................................... 123/476, 478, 123/491

(56) References Cited

U.S. PATENT DOCUMENTS

| | | | | |
|---|---|---|---|---|
| 4,766,865 | * | 8/1988 | Hartel .................................... | 123/476 |
| 4,827,886 | * | 5/1989 | Maeda .................................... | 123/476 |
| 4,911,123 | * | 3/1990 | Ellicott .................................. | 123/476 |
| 5,647,322 | * | 7/1997 | Fukui et al. ........................... | 123/476 |
| 5,699,769 | * | 12/1997 | Uchinami et al. ..................... | 123/276 |
| 5,852,998 | * | 12/1998 | Yoshioka ............................... | 123/491 |
| 5,934,259 | * | 8/1999 | Onishi .................................... | 123/491 |

FOREIGN PATENT DOCUMENTS 63-210230   9/1987 (JP) .

* cited by examiner

Primary Examiner—John Kwon
(74) Attorney, Agent, or Firm—Sughrue, Mion, Zinn, Macpeak & Seas, PLLC (57) ABSTRACT

A fuel injection control system for an internal combustion engine can enhance the starting performance of the engine while avoiding restriction in respect to the degree of freedom in design of peripheral structure of fuel injector. The fuel injection control system includes a fuel injection control means (33A) for driving the fuel injectors (5) of the engine cylinders, respectively, in dependence on a crank angle signal (SGT), engine operating states and a cylinder identifying signal (A) is designed to inject the fuel simultaneously only for the engine cylinders which are not in the suction stroke after generation of the cylinder identifying signal (A) while setting driving time durations (Td) of the fuel injectors (5) on the basis of the demanded fuel quantity Fs and the number N of the cylinders so that a basic fuel quantity Fb per injection for each of the engine cylinders can meet the condition that $Fb=Fs/(N-1)$, to thereby ensure the corrected fuel quantity for the simultaneous fuel injections while preventing fuel deposition onto the spark plugs by inhibiting the fuel injection for the cylinder which is in the suction stroke in the simultaneous fuel injection control.

12 Claims, 8 Drawing Sheets

FUEL INJECTION CONTROL SYSTEM FOR INTERNAL COMBUSTION ENGINE

BACKGROUND OF THE INVENTION

1. Field of the Invention

The present invention relates to a fuel injection control system for an internal combustion engine, which system is designed for performing a simultaneous fuel injection upon starting operation of the engine. More particularly, the present invention is concerned with a fuel injection control system for an internal combustion engine for ensuring a fuel quantity demanded for the simultaneous fuel injection while improving ignitability in the engine operation starting phase.

2. Description of Related Art

Heretofore, in the field of the internal combustion engines for motor vehicles such a fuel injection control system is known which is designed for performing a simultaneous fuel injection for a plurality of cylinders in every ignition cycle in an engine operation starting phase in which a battery voltage is likely to change remarkably with a view to enhancing the ignitability by stabilizing the fuel injection quantity.

Figure 7:
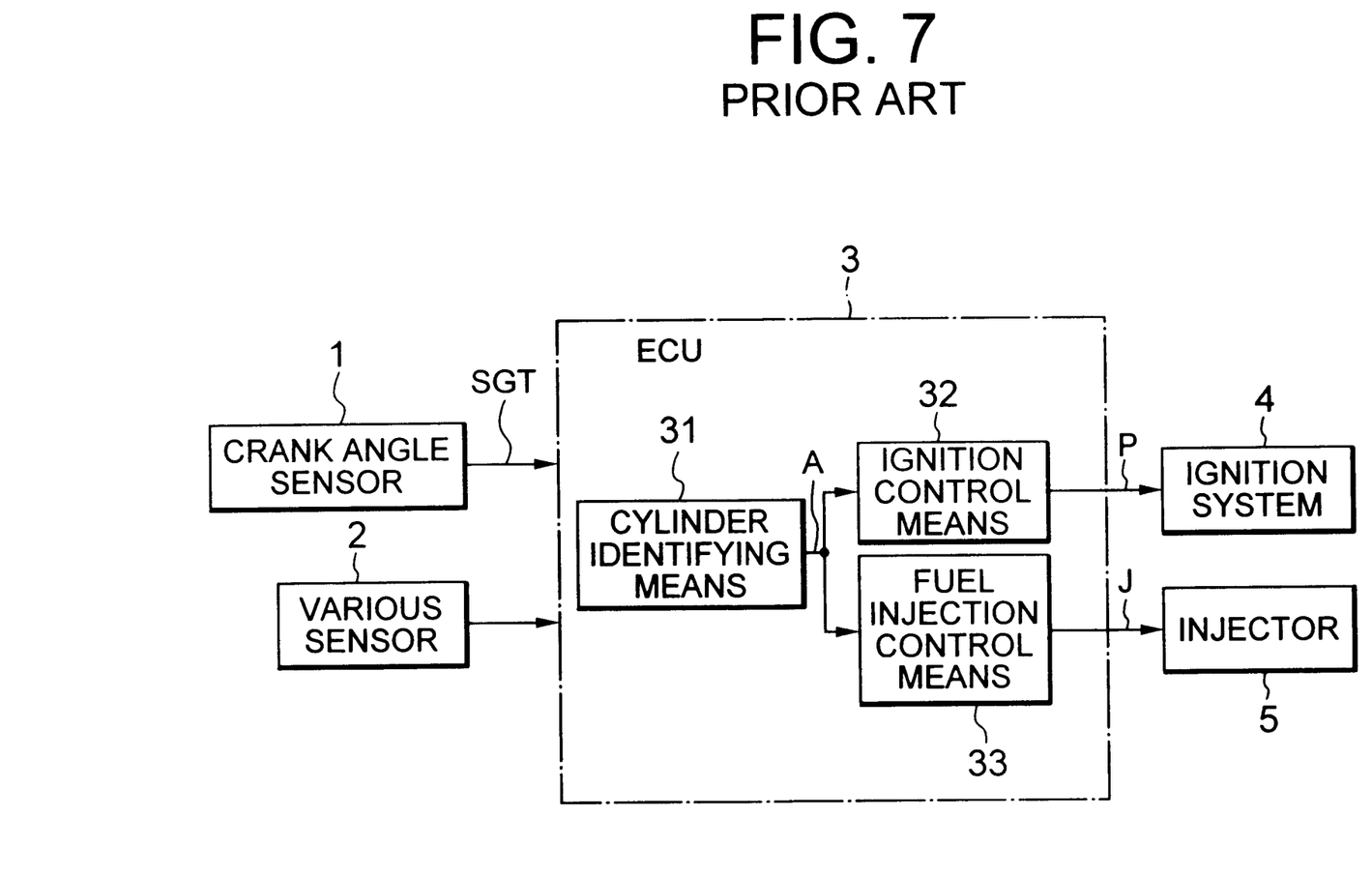
FIG. 7 is a functional block diagram showing schematically a conventional fuel injection control system for an internal combustion engine.
Figure 8:
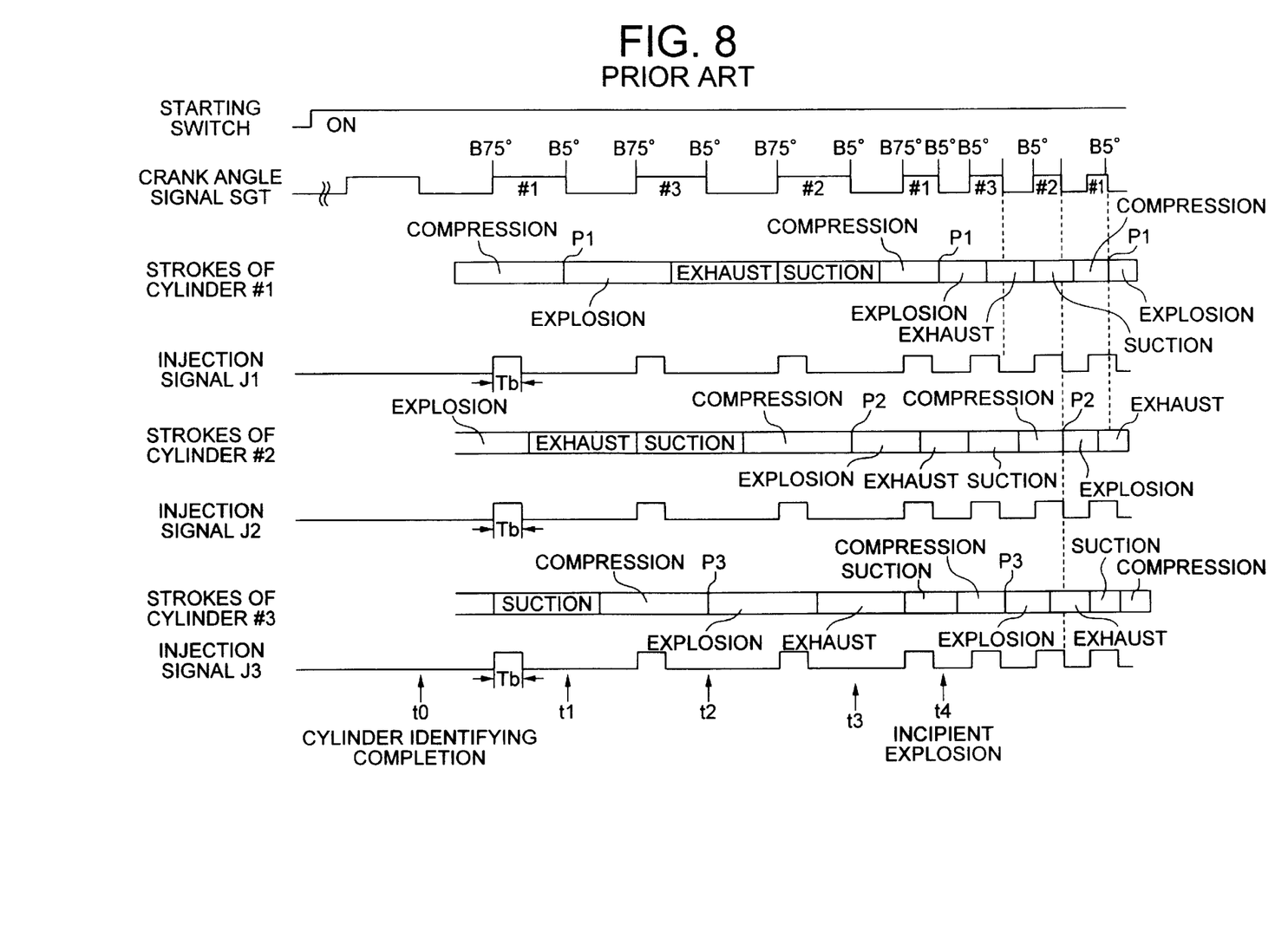
FIG. 8 is a timing chart for illustrating simultaneous fuel injector control operation of the conventional fuel injection control system.

For having better understanding of the invention, background techniques thereof will first be described in some detail. FIG. 7 is a functional block diagram showing schematically a hitherto known or conventional fuel injection control system for an internal combustion engine (hereinafter also referred to simply as the engine) which is presumed to be a three-cylinder engine, only by way of example. FIG. 8 is a timing chart for illustrating injector control operation performed by the conventional fuel injection control system in the engine operation starting phase (i.e., simultaneous fuel injection phase).

Referring to FIG. 8, a crank angle signal SGT carries a train of pulses each having a leading or rising edge and a trailing or falling edge indicative of reference positions (B75° and B5°), respectively, for each of cylinders #1 to #3.

Parenthetically, the reference position B75° represents a position preceding by 75° in terms of the crank angle or CA relative to the top dead center (TDC) in the compression stroke of each cylinder, while the reference position B5° represents a position preceding by 5° CA to the top dead center.

As is well known in the art, the reference position B75° (leading or rising edge) is used as the reference position for the ordinary timer control performed on a cylinder-by-cylinder basis while the reference position B5° (falling edge) is employed for setting the initial ignition timing on a cylinder-by-cylinder basis in the engine operation starting phase.

Further, fuel injection signals J1, J2 and J3 for the individual engine cylinders (#1, #2 and #3) are illustrated in FIG. 8 in combination with operation of an engine starting switch, a crank angle signal SGT and strokes (suction, compression, explosion, and exhaust strokes) of the individual cylinders.

Referring to FIG. 7, a crank angle sensor 1 is installed in association with the crank shaft of the engine (not shown) and designed to generate the crank angle signal SGT carrying a train of pulses which represent the reference positions (B75°, B5°) for the individual cylinders (cylinder #1 to cylinder #3), respectively, in dependence on the rotational positions of the engine, as can be seen in FIG. 8.

A variety of sensors denoted generally and collectively by reference numeral 2 represent a water temperature sensor for detecting, for example, a temperature of cooling water as the temperature information of the engine in addition to a throttle opening sensor, an intake air flow sensor, an engine speed sensor, a starting switch sensor and the like, as is well known in the art. These sensors serve for generating a variety of information indicating operating states of the engine. Of course, the crank angle sensor 1 can also serve as the engine speed sensor as well and may thus be considered as one of the various sensors 2.

An electronic control unit (ECU) 3 which may be constituted by a microcomputer or microprocessor is so designed as to generate an ignition signal P and a fuel injection signal J for controlling the engine operation on the basis of the crank angle signal SGT derived from the output of the crank angle sensor 1 and the engine operating state information derived from the outputs of the various sensors 2.

An ignition system 4 is comprised of a power transistor (not shown), an ignition coil (not shown) and spark plugs (not shown either) and driven in response to the ignition signal P generated in synchronism with the crank angle signal SGT. The power transistor incorporated in the ignition system 4 is turned on and off in response to the ignition signal P. On the other hand, the ignition coil responds to the on/off operations of the power transistor by generating a high voltage for bringing about electric discharge at the spark plugs for driving the engine.

Each of the fuel injectors 5 is actuated in response to the fuel injection signal J (see FIG. 8) having a pulse width or duration substantially proportional to the engine load for injecting a predetermined amount or quantity of fuel into the-associated one of the cylinders of the engine. A basic pulse width or duration Tb of the fuel injection signal J corresponds to the fuel injection time duration of the injector and a sum of the fuel injection quantities in each ignition cycle represents the demanded fuel quantity mentioned previously.

The electronic control unit (ECU) 3 is comprised of a cylinder identifying means 31 for generating a cylinder identifying signal A, an ignition control means 32 for generating the ignition signal P and a fuel injection control means 33 for generating the fuel injection signal J.

The cylinder identifying means 31 incorporated in the electronic control unit 3 is designed to identify each of the engine cylinders on the basis of the crank angle signal SGT to thereby generate the cylinder identifying signal A.

On the other hand, the ignition control means 32 and the fuel injection control means 33 are designed to generate the ignition signal P and the fuel injection signal J, respectively, on the basis of the crank angle signal SGT, the engine operating states represented by the various sensor signals and the cylinder identifying signal A.

For realizing the simultaneous fuel injection in the engine operation starting phase, the fuel injection control means 33 is designed to generate the fuel injection signals J simultaneously for the individual cylinders after the cylinder identification, i.e., after generation of the cylinder identifying signal A.

In that case, the basic fuel quantity Fb per injection for each of the cylinders is set in dependence on the demanded fuel quantity Fs mentioned previously and the number N of the cylinders in accordance with expression (1):

$$Fb=Fs/N \tag{1}$$

Thus, the driving time duration (i.e., the basic pulse width or duration Tb) of the fuel injector 5 for each cylinder is so set that the condition given by above expression (1) can be satisfied. Obviously, in the case of the three-cylinder engine, the basic fuel quantity Fb per injection is one third of the demanded fuel quantity Fs.

At this juncture, it should be mentioned that the cylinder identifying means 31, the ignition control means 32 and the fuel injection control means 33 incorporated in the electronic control unit 3 may be implemented as a program or programs which can be executed by a microcomputer or microprocessor constituting a main part of the electronic control unit 3.

Next, referring to FIG. 8, description will be made in concrete of the operation of the conventional fuel injection control system for the internal combustion engine shown in FIG. 7.

At first, when the operator or driver closes the starting switch, the engine is forced to rotate by a starter motor (not shown). The crank angle sensor 1 produces the crank angle signal SGT in synchronism with the engine rotation, which signal SGT is then inputted to the electronic control unit (ECU) 3.

Since the pulse width of the crank angle signal SGT is offset only for the specific cylinder (e.g. cylinder #2), as is known in the art, the cylinder identifying means 31 installed in the electronic control unit 3 can identify discriminatively the individual cylinders by comparing sequentially the pulse widths of the crank angle signal SGT.

The cylinder identifying means 31 generates the cylinder identifying signal A at the time point (time point t0) at which the cylinder identification has been completed.

Thus, the fuel injection control means 33 starts the simultaneous fuel injection control by outputting the fuel injection signals J1, J2 and J3 each having the basic pulse width Tb for the fuel injectors 5 of all the cylinders in every control cycle of the engine cylinder.

Further, the ignition control means 32 performs a sequential ignition control in the order of the cylinder #1, the cylinder #3 and the cylinder #2 at every ignition time point or timing (i.e., t1, t2, t3, . . . ) of the individual engine cylinders, which time point corresponds to the termination of the compression stroke, as can be seen from the waveforms of the ignition signals P1, P2 and P3 illustrated in FIG. 8.

In that case, because the basic fuel injection quantity Fb determined on the basis of the basic pulse width Tb corresponds to one third of the demanded fuel quantity Fs, the incipient or initial explosion takes place in the engine cylinder at a time point when the basic fuel injection quantity Fb has been accumulated over three cycles for that engine cylinder.

More specifically, the initial explosion takes place in the engine cylinder for which the demanded fuel quantity Fs (=3×Fb) is available due to accumulation up to the initial or first suction stroke from the start of the simultaneous fuel injection control. In this conjunction, it is noted that the basic fuel injection quantity Fb in the compression stroke plays no role in the immediately succeeding ignition control but is accumulated additively as the fuel injection quantity for the ignition control in the succeeding cycle.

In the case of the example illustrated in FIG. 8, the fuel injection quantity for the cylinder #1 reaches at first the demanded fuel quantity Fs. Thus, the initial explosion starts at the time point (t4) for the ignition control for the cylinder #1. More specifically, the initial explosion starts at a time point (time point t4) in the forth ignition cycle from the start (time point t0) of the simultaneous fuel injection control.

In this manner, the engine driving operation is carried out not only by the starting motor but also by the engine itself over the period during which the starting switch is closed. The complete explosion state prevails at the time point at which the engine speed (rpm) has reached a predetermined revolution number e.g. about 600 rpm.

Thus, the operator or driver may open the starting switch for electrically deenergizing the starter motor at the time point at which the engine speed can be regarded as having reached a predetermined revolution number or engine speed (rpm) indicative of the complete explosion state. Thus, the driving state is sustained only by the engine itself without the aid of the starter motor. Further, at this time point, the fuel injection control means 33 changes over the simultaneous fuel injection control mode to the ordinary sequential fuel injection control mode.

As will now be appreciated from the foregoing, in the conventional fuel injection control system for the internal combustion engine, the fuel injection is performed for all the cylinders through the simultaneous fuel injection control in the engine operation starting phase regardless of the stroke statuses of the individual cylinders. Consequently, in the engine in which the injecting direction of the fuel injector 5 is so oriented as to point to the spark plug of the ignition system 4 from the standpoint of design, the fuel injected during the suction stroke is likely to be deposited on the spark plug at the electric discharge gap thereof, giving rise to a problem that the engine starting performance may be degraded due to incapability or failure of the electric discharge.

Further, attempt for suppressing such fuel deposition will then encounter a problem that the degree of freedom in design concerning the disposition of the fuel injector 5 and the peripheral structure of the intake manifold is restricted, making it practically difficult or even impossible to implement the peripheral structures satisfactorily in a miniaturized structure.

Besides, the fuel injection during the suction stroke means that a raw gas will be discharged when the fuel injection temporally overlaps with the opening of the exhaust valve, incurring a problem of environmental pollution.

Additionally, in the conventional fuel injection control system for the internal combustion engine, the fuel injection signal J1; J2; j3 of the predetermined constant basic pulse width Tb is employed for the simultaneous fuel injection control. Consequently, four ignition cycles at least will intervene between the time point t0 at which the cylinder identification has been completed and the initial explosion start time point t4, which means that a lot of time is taken for the start of the initial or incipient explosion, incurring degradation of the starting performance of the engine.

As an approach for avoiding the delay of the initial explosion mentioned above, it is conceivable to perform a preliminary fuel injection for each of the engine cylinders before the cylinder identification is completed. In that case, however, an excess fuel injection quantity state will likely to occur particularly when the operator or driver turns on and off the starting switch at a high frequency, which will unwontedly result in electric conduction of the electric discharge gap of the spark plug. In that case, the starting performance of the engine will be degraded due to the mis-ignition, to another disadvantage.

Of course, it is conceivable to perform the sequential fuel injection control from the time point at which the cylinder identification is completed. However, execution of the sequential fuel injection control in the starting phase in which the battery voltage is instable, as mentioned previously, will give rise to a problem that the starting performance of the engine is degraded due to instability of the fuel injection quantity and hence poor ignitability.

SUMMARY OF THE INVENTION

In the light of the state of the art described above, it is an object of the present invention to solve the problems mentioned above and provide a fuel injection control system for an internal combustion engine which system can ensure an enhanced starting performance for the engine without being subjected to any restriction with regard to the degree of freedom in design of peripheral structure of the fuel injector by virtue of capability of suppressing the fuel deposition onto the spark plugs regardless of the fuel injecting direction of the fuel injector by inhibiting or disabling the fuel injection for the cylinder during the suction stroke in the simultaneous fuel injection control.

It is another object of the present invention to provide a fuel injection control system for an internal combustion engine which system is improved or enhanced in respect to the engine operation starting performance by ensuring at an earlier time point the demanded fuel quantity for the simultaneous fuel injection by correctively increasing the initial fuel injection quantity for the cylinder which does not interfere with the suction stroke in the simultaneous fuel injection control starting phase, to thereby allow the initial or incipient explosion to start at a relatively earlier time point.

In view of the above and other objects which will become apparent as the description proceeds, there is provided according to a general aspect of the present invention a fuel injection control system for an internal combustion engine, which system includes a crank angle sensor for generating a crank angle signal indicative of rotational positions of the engine, a variety of sensors for detecting operating states of the engine, fuel injectors for injecting a demanded quantity of fuel into a plurality of cylinders of the engine, a cylinder identifying means for identifying each of the engine cylinders on the basis of the crank angle signal to thereby generate a cylinder identifying signal, and a fuel injection control means for driving the fuel injectors of the engine cylinders, respectively, in dependence on the crank angle signal, the engine operating states and the cylinder identifying signal, wherein the fuel injection control means is so designed as to inject the fuel simultaneously only for the engine cylinders which are not in the suction stroke after generation of the cylinder identifying signal while setting driving time durations of the fuel injectors on the basis of the demanded fuel quantity Fs and the number N of the cylinders so that a basic fuel quantity Fb per injection for each of the engine cylinders can meet the condition that $Fb=Fs/(N-1)$.

By virtue of the arrangement of the fuel injection control system for the internal combustion engine described above, the fuel quantity demanded for the simultaneous fuel injection can be ensured while the fuel injection for the cylinder which is in the suction stroke when the simultaneous fuel injection control is being performed can be disabled for thereby preventing the deposition of fuel onto the spark plug at the discharge gap thereof, whereby the starting performance of the engine can be improved or enhanced without encountering substantially any restriction or limitation in respect to the degree of freedom in design of the peripheral structure around the fuel injector, to advantageous effect.

In a preferred mode for carrying out the invention, the fuel injection control system for the internal combustion engine may further include a fuel injection quantity correcting means for correcting the driving time duration of the fuel injector in response to the cylinder identifying signal, wherein the fuel injection quantity correcting means may be composed of an enforcive interrupting means for limiting the driving time duration of the fuel injector so that the injector driving time duration does not interfere or overlap with the suction stroke of each of the individual cylinders.

With the arrangement of the fuel injection control system described above, the fuel injection for the cylinder which is in the suction stroke can be prevented without fail, whereby the starting performance of the engine can further be enhanced.

In another preferred mode for carrying out the invention, such arrangement may be adopted that when such cylinder whose exhaust stroke interferes or overlaps at least partially with the driving time duration of the fuel injector should exist, the enforcive interrupting means may cut or invalidate forcibly the driving time duration of the fuel injector for the above-mentioned cylinder at a time point substantially corresponding to the ignition timing of the other cylinder.

With the arrangement of the fuel injection control system described above, the fuel injection for the cylinder which is in the suction stroke can positively be prevented without fail, whereby the operation starting performance of the engine can further be improved.

In yet another preferred mode for carrying out the invention, the various sensors may include at least a sensor for generating information concerning at least one of a revolution number or engine speed (rpm) and a temperature of the internal combustion engine, wherein the enforcive interrupting means may be so designed as to set variably an interruption timing for cutting off or invalidating the driving time duration of the fuel injector in dependence on the information concerning at least one of the revolution number (rpm) and the temperature.

Owing to the arrangement of the fuel injection control system described above, the fuel injection for the cylinder which is in the suction stroke can positively be prevented independently of the engine operating state, whereby the starting performance of the engine can further be enhanced.

In still another preferred mode for carrying out the invention, the enforcive interrupting means may be so designed as to be validated at least in N-th or alternatively 2N-th ignition cycle after generation of the cylinder identifying signal.

With the arrangement of the fuel injection control system described above, ineffective fuel injection cut-off operation can be prevented immediately after starting of the engine operating at a low speed.

In a further preferred mode for carrying out the invention, the fuel injection quantity correcting means may further include a fuel increase correcting means for increasing temporarily the fuel injection quantity, wherein the fuel increasing correcting means may be so designed as to set only a first shot of fuel injection quantity to be about (N−1) multiple of the basic fuel injection quantity only for the engine cylinder whose exhaust stroke interferes or overlaps with the first fuel injection time point after the generation of the cylinder identifying signal.

Owing to the arrangement of the fuel injection control system described above, the fuel injection quantity as demand for the simultaneous fuel injection can be ensured, and thus the initial or incipient explosion can be started earlier, which is advantageous for enhancement of the starting performance of the engine.

In a yet further preferred mode for carrying out the invention, the various sensors may include a sensor for generating information concerning at least one of a revolution number or engine speed (rpm) and a temperature of the internal combustion engine, wherein the fuel increase correcting means may be so designed as to set variably the first shot of fuel injection quantity in dependence on the information concerning at least one of the revolution number and the temperature.

With the arrangement of the fuel injection control system mentioned above, the fuel increase correcting quantity can be secured optimally in dependence on the operating state of the engine.

In a still further preferred mode for carrying out the invention, the fuel injection control system for the internal combustion may further include a fuel injection quantity correcting means for correcting the driving time duration of the fuel injector in response to the cylinder identifying signal. In that case, the fuel injection quantity correcting means may include a fuel increase correcting means for increasing temporarily the fuel injection quantity, wherein the fuel increasing correcting means may be so designed as to set only a first shot of fuel injection quantity to be about (N−1) multiple of the basic fuel injection quantity only for the engine cylinder whose exhaust stroke interferes or overlaps with the first fuel injection time point after the generation of the cylinder identifying signal.

Owing to the arrangement of the fuel injection control system described above, the initial or incipient explosion can be made to start at an earlier time point, advantageously for enhancement of the starting performance of the engine.

In a preferred mode for carrying out the invention, the various sensors may include a sensor for generating information concerning at least one of a revolution number or engine speed (rpm) and a temperature of the internal combustion engine, wherein the fuel increase correcting means may be so designed as to set variably the first shot of fuel injection quantity in dependence on the information concerning at least one of the revolution number and the temperature.

With the arrangement of the fuel injection control system described above, the fuel increase correcting quantity optimal for the prevailing engine operation state can be ensured.

According to another aspect of the invention, there is provided a fuel injection control system for an internal combustion engine, which system includes a crank angle sensor for generating a crank angle signal indicative of rotational positions of the engine, a variety of sensors for detecting operating states of the engine, fuel injectors for injecting a demanded quantity of fuel into a plurality of cylinders of the engine, a cylinder identifying means for identifying each of the engine cylinders on the basis of the crank angle signal to thereby generate a cylinder identifying signal, a fuel injection control means for driving the fuel injectors of the engine cylinders, respectively, in dependence on the crank angle signal, the engine operating state and the cylinder identifying signal, and a fuel injection quantity correcting means for correcting the driving time duration of the fuel injectors in response to the cylinder identifying signal, wherein the fuel injection control means is so designed as to inject the fuel simultaneously for the engine cylinders after generation of the cylinder identifying signal while setting driving time durations of the fuel injectors on the basis of the demanded fuel quantity Fs and the number N of the cylinders so that a basic fuel quantity Fb per injection for each of the engine cylinders can meet the condition that Fb=Fs/N. In that case, the fuel injection quantity correcting means may include a fuel increase correcting means for increasing temporarily the fuel injection quantity, wherein the fuel increasing correcting means may be so designed as to set only a first shot of fuel injection quantity to be about (N−1) multiple of the basic fuel injection quantity only for the engine cylinder whose exhaust stroke interferes or overlaps even partially with the first fuel injection time point after the generation of the cylinder identifying signal.

Owing to the arrangement of the fuel injection control system described above, the initial or incipient explosion can be forced to start earlier, advantageously to the enhancement of the starting performance of the engine.

In another preferred mode for carrying out the invention, the various sensors may include a sensor for generating information concerning at least one of the revolution number or engine speed (rpm) and temperature of the internal combustion engine, wherein the fuel increase correcting means may be so designed as to set variably the first shot of fuel injection quantity in dependence on the information concerning at least one of the revolution number and the temperature.

With the arrangement of the fuel injection control system described above, the fuel increase correcting quantity optimal for the prevailing engine operation state can be ensured.

The teachings of the present invention disclosed herein can also be implemented as a method of controlling the fuel injection for a multi-cylinder engine, which method can be carried out as a program executable with a computer.

Thus, according to another aspect of the present invention, there is provided a method of controlling fuel injection for an internal combustion engine having a plurality of engine cylinders, which method includes the steps of generating a crank angle signal indicative of rotational positions of the engine, detecting operating states of the engine, injecting a demanded quantity of fuel into a plurality of cylinders of the engine, identifying each of the engine cylinders on the basis of the crank angle signal thereby generate a cylinder identifying signal and driving fuel injectors of the cylinders, respectively, in dependence on the crank angle signal, the engine operating states and the cylinder identifying signal, wherein fuel is injected simultaneously only for the engine cylinders which are not in the suction stroke after the generation of the cylinder identifying signal while setting driving time durations of the fuel injectors on the basis of the demanded fuel quantity Fs and the number N of the cylinders so that a basic fuel quantity Fb per injection for each of the engine cylinders can meet the condition that Fb=Fs/(N−1).

The method described above can be implemented as a computer-executable program, as mentioned previously. Accordingly, it is contemplated that the present invention is also to cover a recording medium which stores the program mentioned above.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Now, description will be made in detail of the fuel injection control system for an internal combustion engine according to a first embodiment of the present invention.

Figure 1:
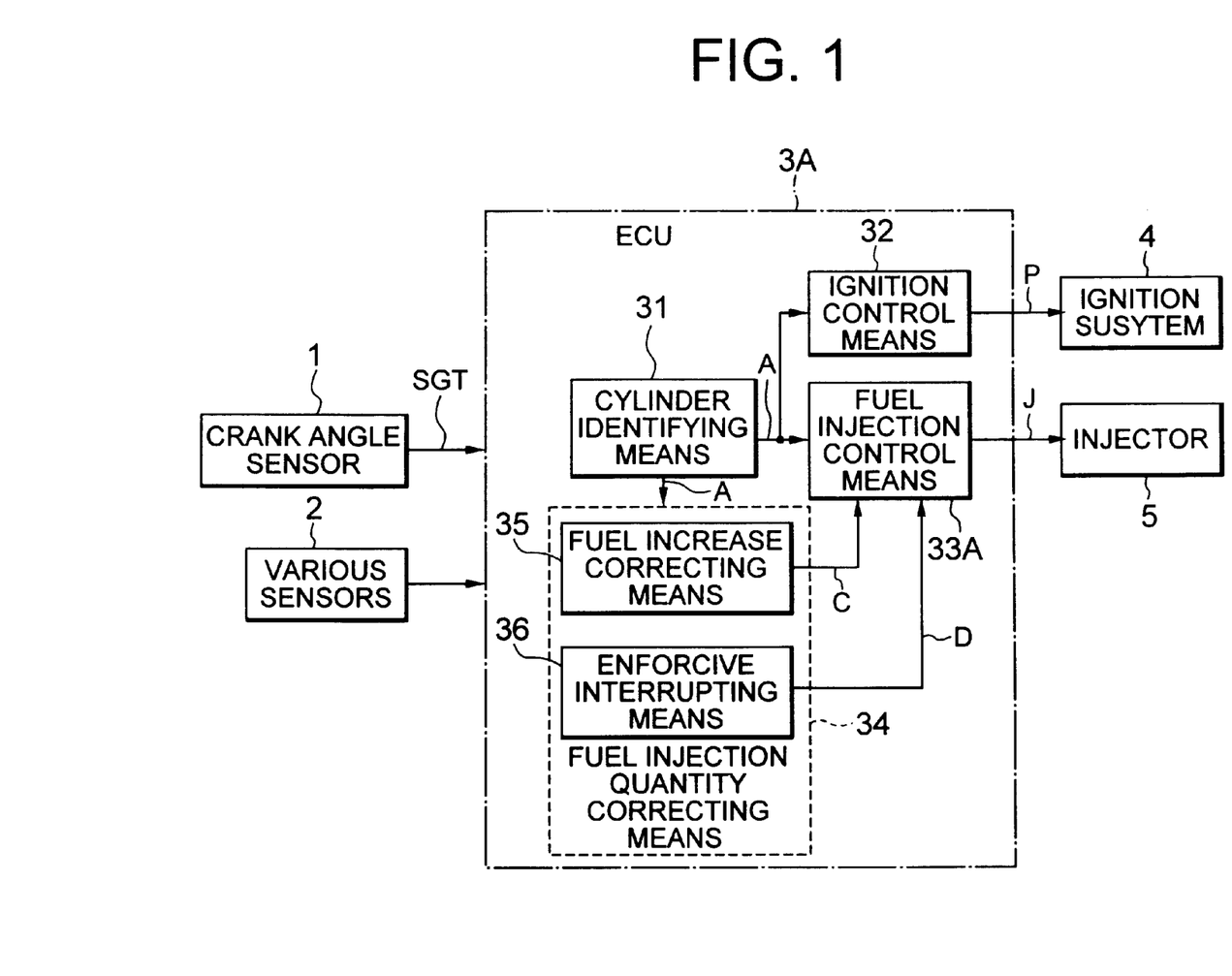
FIG. 1 is a functional block diagram showing a general arrangement of a fuel injection control system for an internal combustion engine according to a first embodiment of the present invention.

FIG. 1 is a functional block diagram showing a general arrangement of the fuel injection control system. In the figure, like parts or components as those described hereinbefore by reference to FIG. 7 are denoted by like reference symbols, and repeated description thereof is omitted.

Figure 2:
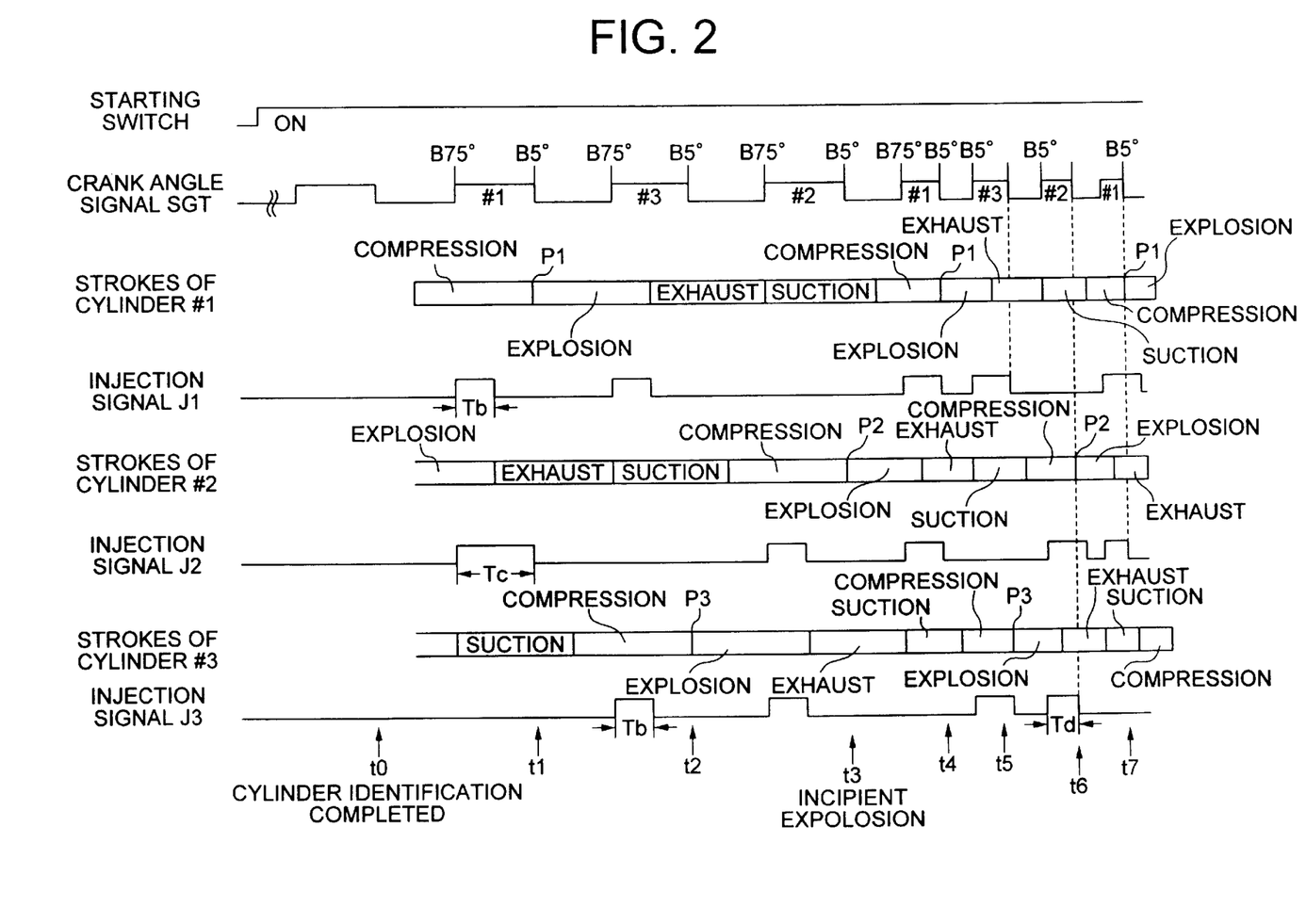
FIG. 2 is a timing chart for illustrating the simultaneous fuel injection control operation of the fuel injection control system according to the first embodiment of the present invention.

FIG. 2 is a timing chart for illustrating the injector control operation of the fuel injection control system in the engine operation starting phase (simultaneous fuel injection phase) according to the first embodiment of the invention, wherein like signals and events as those described hereinbefore by reference to FIG. 8 are denoted by like reference symbols, and repeated description thereof is omitted.

Referring to FIG. 1, an electronic control unit (ECU) 3A includes a fuel injection quantity correcting means 34 provided in association with a fuel injection control means 33A in addition to the cylinder identifying means 31, the ignition control means 32 and the fuel injection control means 33A, wherein the fuel injection quantity correcting means 34 is comprised of a fuel increase correcting means 35 and an enforcive interrupting means 36.

The fuel injection control means 33A is designed to inject the fuel simultaneously only for the cylinders which are not in the suction stroke after generation of the cylinder identifying signal A. In other words, no fuel injection signal J is applied to the fuel injector 5 of the cylinder which is currently in the suction stroke, to thereby disable the fuel injection for that cylinder.

Further, the fuel injection control means 33A is also so designed or programmed as to set the driving time duration or period (i.e., basic pulse width or duration Tb) of the fuel injector 5 on the basis of the demanded fuel quantity Fs in each ignition cycle and the number N of the cylinders so that the basic fuel quantity Fb per injection for each engine cylinder can meet the condition given by the following the expression (2).

$$Fb=Fs/(N-1) \qquad (2)$$

Thus, in the case of the three-cylinder engine, the basic fuel quantity Fb per injection essentially corresponds to a half of the demanded fuel quantity Fs.

The fuel injection quantity correcting means 34 incorporated in the electronic control unit (ECU) 3A is so designed or programmed as to generate a fuel increase correcting signal C for correcting the driving time duration of the fuel injector 5 or generate an enforcive interrupting signal D, as occasion requires, in response to the cylinder identifying signal A.

The fuel increasing correcting means 35 incorporated in the fuel injection quantity correcting means 34 is designed or programmed to generate the fuel increase correcting signal C for increasing temporarily the fuel injection quantity only for the cylinder(s) which is in the exhaust stroke at the first fuel injection timing (time point) after the generation of the cylinder identifying signal A.

The fuel injection control means 33A responds to the fuel increase correcting signal C by setting the first fuel injection quantity for the cylinder which is in the exhaust stroke (the cylinder #2 illustrated in FIG. 2) to be about (N−1) multiple of the basic fuel injection quantity Fb. In other words, in the case of the three-cylinder engine, the driving time period or duration Tc per injection for the cylinder #2 is so set as to be about two times as long as the basic pulse width or duration Tb (about twice as large as the basic fuel injection quantity Fb). Thus, the fuel injection quantity for the cylinder #2 amounts to the demanded fuel quantity Fs in response to only the first fuel injection signal J2 alone, and hence the initial or incipient explosion can start in the cylinder #2 at the first ignition control time point t3.

The fuel increase correcting means 35 is designed or programmed to set variably the first or initial fuel injection quantity in dependence on at least one of the engine speed (rpm) information and the temperature information derived from the outputs of the relevant sensors of the various sensor set 2. By way of example, when the engine speed and/or the temperature is relatively high, the correctively increased fuel quantity for the first single shot of fuel injection is reduced, and vice versa.

On the other hand, the enforcive interrupting means 36 incorporated in the fuel injection quantity correcting means 34 serves to limit the driving time duration of the fuel injector 5 so that it does not interfere or overlap even partially with the suction stroke of the individual cylinders. In more concrete, when there exists the cylinder whose exhaust stroke is currently interfering or overlapping even partially with the driving time duration of the fuel injector 5, the enforcive interrupting means 36 is actuated to invalidate forcibly the driving time duration Td of the fuel injector 5 for that cylinder around the ignition timing (reference position B5°) of the other cylinders, as illustrated in FIG. 2. In this way, interference or overlap of the injector driving time period or duration with the suction stroke succeeding to the exhaust stroke can be suppressed positively.

Further, the enforcive interrupting means 36 is also so designed or programmed as to set variably the timing for invalidating or interrupting the driving time duration Td of the fuel injector 5 in dependence on at least one of the engine speed (rpm) and the temperature.

The timing for interrupting or cutting off the driving time duration Td may be set at a retarding side relative to the reference position B5° for the ignition-controlled cylinder, for example, when the engine speed (rpm) or the temperature is relatively low, while the interruption timing may be set such that it coincides at least approximately with the reference position B5°, when the engine speed or the temperature of the engine is relatively high.

The enforcive interrupting means 36 is validated at least in N-th or alternatively 2N-th ignition cycle after generation of the cylinder identifying signal A. By way of example, in the case of the three-cylinder engine, the driving time duration of the fuel injector 5 is not forcibly cut in the third to the sixth ignition cycles (t1 to t3 or t1 to t6) from the start of the simultaneous fuel injection, the reason for which can be explained by the fact that in the initial phase of the engine starting operation, the engine speed (rpm) is extremely low with the time taken for transition from the exhaust stroke to the suction stroke being relatively long, which in turn means that the possibility of the interference or overlap with the suction stroke is extremely low. Thus, in practical applications, there arises no necessity of cutting or interrupting enforcively the injector driving time duration during the exhaust stroke.

Next, referring to flow charts of FIGS. 3 to 5 together with FIG. 2, description will be made in concrete of operations of the fuel injection control system according to the first embodiment of the present invention.

In the following description, it is presumed that the present invention is applied to the three-cylinder engine. However, the invention is never restricted to the three-cylinder engine. It goes without saying that the teachings of the present invention can equally be applied to multi-cylinder engines inclusive of a four-cylinder engine and others.

Figure 3:
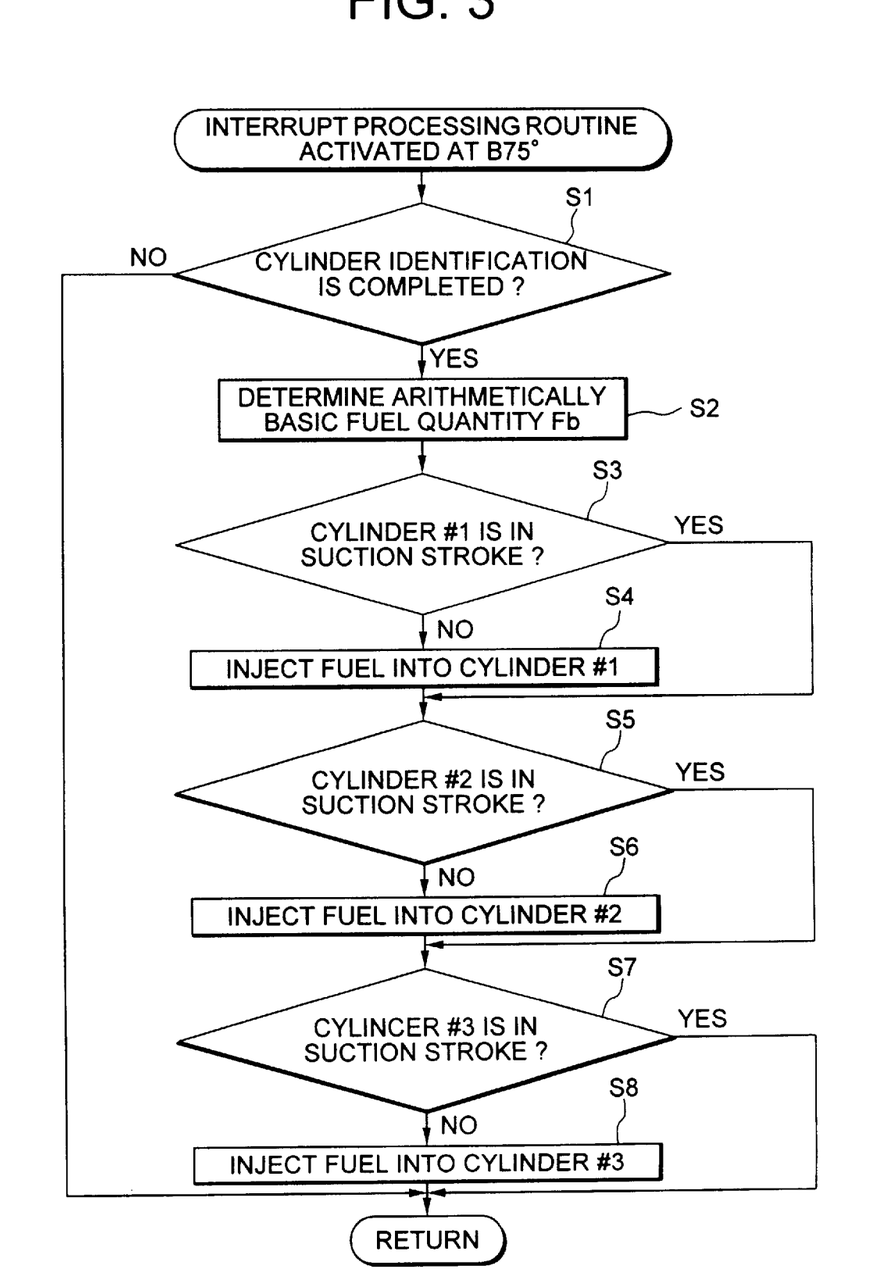
FIG. 3 is a flow chart for illustrating the simultaneous fuel injection control operation of the fuel injection control system according to the first embodiment of the present invention.

FIG. 3 is a flow chart for illustrating a processing routine for inhibiting or disabling the fuel injection to the cylinder which is in the suction stroke, wherein no consideration is paid to the operation of the fuel increase correcting means 35. The processing routine illustrated in FIG. 3 is executed by the fuel injection control means 33A incorporated in the electronic control unit 3A as an interrupt processing routine at every reference position B75°.

Figure 4:
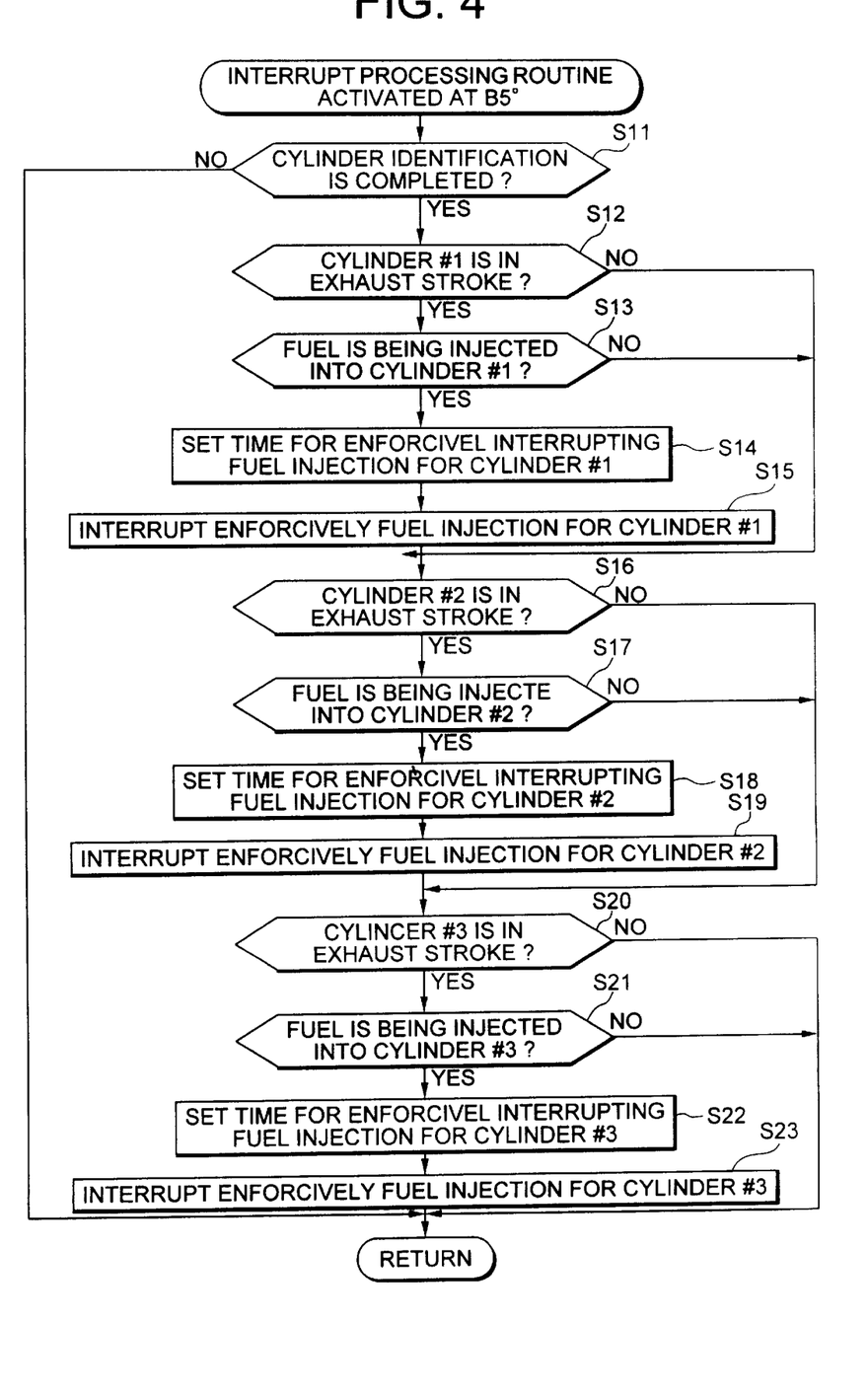
FIG. 4 is a flow chart for illustrating a control operation for cutting or shutting off enforcively a fuel injection signal in the fuel injection control system according to the first embodiment of the present invention.

On the other hand, FIG. 4 shows a flow chart for illustrating a control routine for cutting enforcively the fuel injection time duration for the cylinder which is in the exhaust stroke. This control routine is executed by through cooperation of the fuel injection control means 33A and the enforcive interrupting means 36 as an interrupt processing routine at every reference position B5°.

Figure 5:
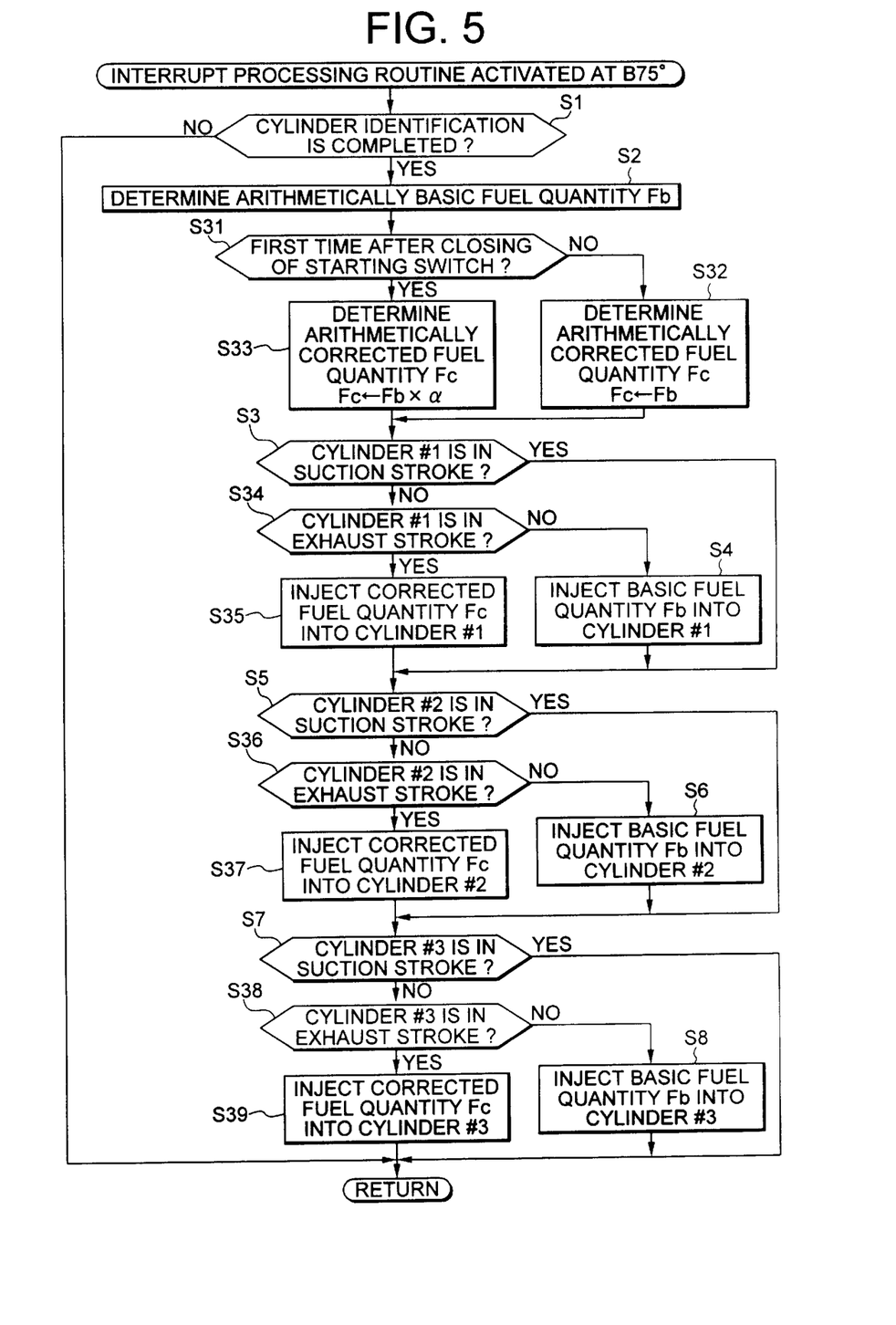
FIG. 5 is a flow chart for illustrating a control operation for increasing correctively the fuel injection quantity in the fuel injection control system according to the first embodiment of the invention.

Further, FIG. 5 shows a flow chart for illustrating a control routine for increasing correctively the first shot of fuel injection quantity for the cylinder which is in the exhaust stroke. This control routine is executed by the fuel injection control means 33A and the fuel increase correcting means 35 as an interrupt processing routine at every reference position B5°.

Now referring to FIG. 3, the fuel injection control means 33A makes decision on the basis of presence/absence of the cylinder identifying signal A as to whether or not the cylinder identification has been completed (step S1). Unless the cylinder identification is completed (i.e., when the decision step S1 results in negation "NO"), the processing is terminated intactly.

By contrast, when it is decided in the step S1 that the cylinder identification has been completed (i.e., when the decision step S1 results in affirmation "YES"), the first basic fuel injection quantity Fb for the simultaneous fuel injection is arithmetically determined (step S2), which is then followed by a step S3 where it is decided whether the cylinder #1 is currently in the suction stroke or not.

When it is decided in the step S3 that the cylinder #1 is not in the suction stroke (i.e., when the decision step S3 results in "NO"), injection of the basic fuel injection quantity Fb is carried out for the cylinder #1, whereon the processing proceeds to a step S5.

On the other hand, when it is decided in the step S3 that the cylinder #1 is in the suction stroke (i.e., when the decision step S3 results in "YES"), the processing then proceeds to the step S5 without executing the fuel injection step S4 for the cylinder #1.

Processing steps S5 and S6 performed for the cylinder #2 correspond, respectively, to the steps S3 and S4 for the cylinder #1 described above, while processing steps S7 and S8 are executed for the cylinder #3 and correspond, respectively, to the steps S3 and S4 executed for the cylinder #1.

The fuel injection control means 33A makes decision as to whether or not the cylinder #2 is currently in the suction stroke in the step S5. When it is decided that the cylinder #2 is not in the suction stroke (i.e., when decision step S5 is negative "NO"), injection of the basic fuel injection quantity Fb to the cylinder #2 is carried out in a step S6. On the other hand, when decision is made in the step S5 that the cylinder #2 is currently in the suction stroke (i.e., when the step S5 is affirmative "YES"), the processing then proceeds to a step S7 without executing the fuel injection step S6.

Similarly to the case of the example described above, in the case of the fuel injection for the cylinder #3 in steps S7 and S8, the fuel injection control means 33A makes decision as to whether or not the cylinder #3 is currently in the suction stroke in the step S7. When it is decided that the cylinder #3 is not in the suction stroke (i.e., when step S7 is negative "NO"), injection of the basic fuel injection quantity Fb to the cylinder #3 is carried out in a step S8. On the other hand, when decision is made in the step S7 that the cylinder #3 is currently in the suction stroke (i.e., when the step S7 is affirmative "YES"), the processing routine illustrated in FIG. 3 comes to an end and return is made to the step S1 without executing the fuel injection step S8.

In this way, by inhibiting or disabling the fuel injection for the cylinder which is currently in the suction stroke in the simultaneous fuel injection control performed after the cylinder identification, occurrence of ignition failure due to the fuel deposition onto the spark plug can positively be suppressed, whereby the starting performance of the engine can be enhanced.

Next, description will be directed to the operation of the fuel injection control means 33A performed in response to the enforcive interrupting signal D issued by the enforcive interrupting means 36.

Referring to FIG. 4, the enforcive interrupting means 36 makes decision at first as to whether or not the cylinder identification has been completed on the basis of presence/absence of the cylinder identifying signal A (step S11). Unless the cylinder identification is completed (i.e., when the step S11 results in "NO"), any further processing is not executed, but return is made intactly.

By contrast, when decision is made in the step S11 that the cylinder identification has been completed (i.e., when the step S11 results in "YES"), then it is decided in a step 12 whether or not the cylinder #1 is in the exhaust stroke.

When it is decided in the step S12 that cylinder #1 is in the exhaust stroke (i.e., when the step S12 results in "YES"), then the succeeding step S13 is executed for deciding whether fuel is currently being injected into the cylinder #1.

When it is decided in the step S13 that the fuel is being injected into the cylinder #1 currently (i.e., when the step S13 results in "YES"), the interrupting time for cutting forcibly the fuel injection for the cylinder #1 is set in a step S14, to thereby cut or shut off forcibly the fuel injection for the cylinder #1 in a step S15, whereon the processing routine proceeds to a step S16.

On the other hand, when it is decided in the step S12 that the cylinder #1 is not in the exhaust stroke (i.e., when the step S12 results in "NO") or when decision step S13 results in that the fuel injection is not being performed for the cylinder #1 (NO), the processing routine then proceeds to the step S16 without executing the steps S14 and S15.

Processing steps S16 to S19 are executed for the cylinder #2, while processing steps S20 to S23 are executed for the cylinder #3. Because these steps are similar to the steps S12 to S15 for the cylinder #1 described hereinbefore, description of the steps S16 to S23 will be omitted.

In this way, by cutting forcibly the pulse duration of the fuel injection signal J for the cylinder which is in the exhaust stroke, the fuel injection signal J is prevented from being effective in the suction stroke, whereby the fuel injection during the suction stroke can be prevented without fail.

It will now be appreciated that according to teachings of the present invention, the starting performance of the engine can be significantly enhanced because occurrence of the ignition failure due to the fuel deposition onto the spark plug can be excluded.

Parenthetically, in the case of the example illustrated in FIG. 2, the driving time duration Td (fuel injection signal J) is cut or invalidated forcibly at the time points t5, t6 or t7 synchronous to the reference position B5°.

As mentioned hereinbefore, the enforcive interrupting means 36 is so designed or programmed as to be capable of setting variably the interrupt timing or time point for the driving time duration of the fuel injector 5 in dependence on at least one of the engine speed (rpm) and the cooling water temperature so that the effective fuel injection can be realized within a period which does not interfere or overlap with the suction stroke.

More specifically, when the engine speed (or the cooling water temperature) is relatively low, a relatively long time intervenes in transition from the exhaust stroke to the suction stroke. Accordingly, the interruption timing of the fuel injection should preferably be set at a retarded side relative to the reference position B5° within a permissible range in order to ensure an adequate fuel injection quantity.

Thus, the fuel injection quantity as demanded in dependence on the driving state can be ensured within a permissible range while preventing positively the fuel injection into the cylinder during the suction stroke by forcibly cutting the fuel injection, whereby the starting performance of the engine can be enhanced significantly, to an advantage.

Further, degradation of quality of the exhaust gas due to discharge of the raw gas through the exhaust valve whose opening timing overlaps with the suction stroke can be prevented, to another advantage.

Further, since the operation of the enforcive interrupting means 36 is validated at least in the N-th or alternatively 2N-th ignition cycle (e.g. third or sixth ignition cycle when the cylinders number N is equal to "3") after the generation of the cylinder identifying signal A, fruitless execution of the fuel injection shut-off immediately after the engine is started at a very low engine speed (rpm) can be suppressed, to another advantage.

Next, referring to FIG. 5, description will turn to operation of the fuel injection control means 33A effectuated in response to the fuel increase correcting signal C issued by the fuel increase correcting means 35. In the flow chart shown in FIG. 5, processing steps S1 to S8 are similar to those S1 to S8 described hereinbefore by reference to FIG. 3. Accordingly, repetitional description of these steps will be unnecessary.

Further, the processing steps S3, S4, S34 and S35 for the cylinder #1 are similar to the processing steps S5, S6, S36 and S37 for the cylinder #2 and the processing steps S7, S8, S38 and S39 for the cylinder #3, respectively, with correspondences being found thereamong. Accordingly, the following description will be made in conjunction with the processings for the cylinder #1 representatively, being understood that substantially same holds true for the cylinders #2 and #3.

At first, the fuel injection control means 33A executes the processing step S2 for determining the basic fuel injection quantity Fb, which is then followed by a step S31 where it is decided by the fuel increase correcting means 35 whether or not the current processing is first time after the starting switch has been closed.

When it is decided in the step S31 by the fuel increase correcting means 35 that the processing now concerned is not the first after closing of the starting switch (i.e., when the decision step S31 results in "NO"), the basic fuel injection quantity Fb is set as the corrected fuel quantity Fc in a step S32.

By contrast, when the decision is made in the step S31 that the current processing is the first after the starting switch has been turned on (i.e., when the step S31 results in "YES"), then a value obtained by multiplying the basic fuel injection quantity Fb by a correcting coefficient α (>1) is set as the corrected fuel quantity Fc in a step S33.

Namely, $$Fc = Fb \times \alpha \tag{3}$$

Incidentally, in the case of the three-cylinder engine, the correcting coefficient a can be set to about "2". Accordingly, the corrected fuel quantity Fc is about twice as large as the basic fuel injection quantity Fb.

When it is decided in the step S3 that the cylinder #1 is not in the suction stroke (i.e., when the decision step S3 results in "NO"), then decision is made as to whether the cylinder #1 is in the exhaust stroke (step S34). When it is decided that the cylinder #1 is not in the exhaust stroke (i.e., when the step S34 results in "NO"), the basic fuel injection quantity Fb is injected into the cylinder #1 in a step S4.

On the-other hand, when decision is made in the step S34 that the cylinder #1 is in the exhaust stroke (i.e., when decision step S34 results in "YES"), then the corrected fuel quantity Fc is injected into the cylinder #1 in a step S35, whereupon the processing routine proceeds to the step S5.

In this way, when the cylinder #1 is in the exhaust stroke upon execution of the first processing after closing of the starting switch, then the pulse width or duration of the fuel injection signal J is corrected so that the fuel quantity for injection is increased. In other words, the corrected fuel quantity Fc is injected into the cylinder #1.

By contrast, when the current processing is the second after turn-on of the starting switch, the basic fuel injection quantity Fb is set in place of the corrected fuel quantity Fc in the processing step S32. Consequently, the fuel injection quantity is not correctively increased.

In succession, the processings succeeding to the steps S5 and S7 are repetitively executed for the cylinders #2 and #3, whereby the fuel injection quantity is correctively increased only for the cylinder which is in the exhaust stroke when the fuel injection control is carried out first time after the turn-on of the starting switch.

As will be understood from the foregoing description, by performing the fuel increasing correction of the first one shot of fuel injection for the cylinder which is in the exhaust stroke, the incipient explosion start timing can be advanced from the time point t4 (see FIG. 8) to the time point t3 (see FIG. 2), whereby the starting performance of the engine can be enhanced.

The fuel increase correcting means is arranged to set variably the first one short of the fuel injection quantity (the correctively increased fuel quantity) in dependence on at least one of the engine speed and the cooling water temperature. By way of example, when the engine speed or the cooling water temperature is relatively low, the demanded quantity Fs of the fuel increases. Accordingly, in that case, the correctively increased fuel quantity is set larger than the (N−1) multiple of the basic fuel injection quantity Fb.

In this manner, optimal fuel increasing correction can be realized in dependence on the operating state of the internal combustion engine, whereby the incipient explosion can be started without fail, which in turn means that the starting performance can further be enhanced.

Embodiment 2

In the fuel injection control system according to the first embodiment, the fuel injection quantity correcting means 34 is provided in association with the fuel injection control means 33A. However, the starting performance of the engine can be enhanced only with the aid of the fuel injection control means 33A without resorting to the fuel injection quantity correcting means 34.

In the fuel injection control system according to a second embodiment of the present invention, the fuel injection control means 33A is so designed as to perform the simultaneous fuel injection only for the cylinder(s) which is not in the suction stroke for preventing deposition of the fuel onto the spark plugs. Thus, the engine starting performance can be improved without degrading the degree of freedom in design of the fuel injector 5.

Embodiment 3

In the fuel injection control system according to the first embodiment of the invention, both the fuel increase correcting means 35 and the enforcive interrupting means 36 are provided as the fuel injection quantity correcting means 34. In the fuel injection control system according to a third embodiment of the invention, either the enforcive interrupting means 36 or the fuel increase correcting means 35 is provided. With this arrangement, the starting performance of the engine can be improved without impairing the degree of freedom in design of the fuel injector 5.

Embodiment 4

In the fuel injection control system according to the first embodiment of the invention, the fuel increase correcting means 35 is provided in association with fuel injection control means 33A which is designed for performing the simultaneous fuel injection for the cylinders which are not in the suction stroke.

Figure 6:
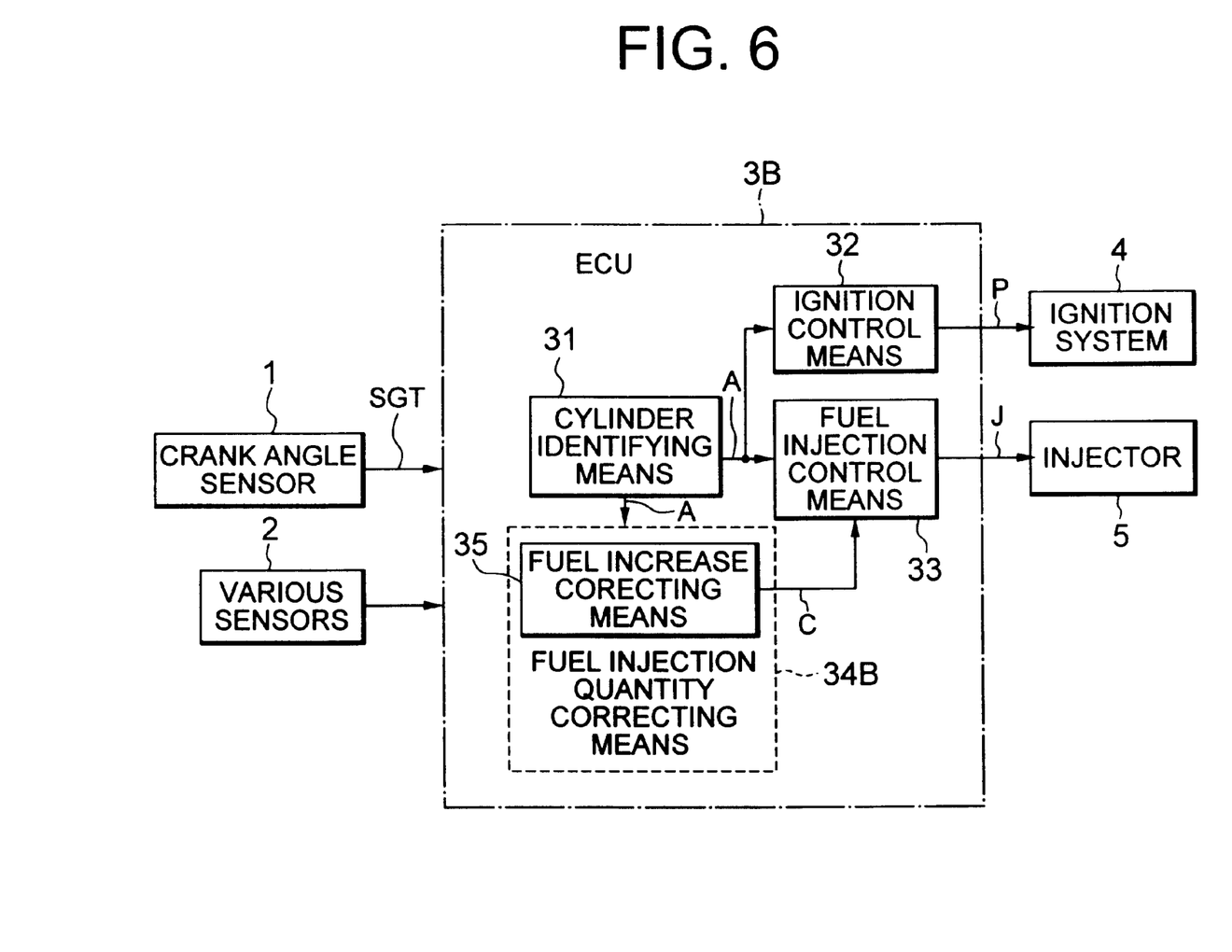
FIG. 6 is a functional block diagram showing schematically a general arrangement of a fuel injection control system for an internal combustion engine according to a fourth embodiment of the present invention.

In the fuel injection control system according to a fourth embodiment of the present invention, the fuel increase correcting means 35 is provided in association with the conventional fuel injection control means 33 as shown in FIG. 6.

As can be seen in FIG. 6, a fuel injection quantity correcting means 34B incorporated in an electronic control unit 3B includes only the fuel increase correcting means 35 and is provided in combination with the fuel injection control means 33. By providing the fuel increase correcting means 35 for the fuel injection control means 33 designed to perform the simultaneous fuel injection for all the cylinders, the incipient or initial explosion start timing can be advanced effectively, whereby the engine starting performance can equally be enhanced.

In this case, by adopting the arrangement for setting variably or controllably the fuel increase correcting quantity in dependence on the engine operating state (engine speed or temperature), the engine starting performance can further be improved.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, although the present invention has been described in conjunction with the fuel injection control system for the internal combustion engine, teachings of the invention can be implemented as the methods typified by the flow charts described hereinbefore in the form of program or programs which can be executed with the computer such as a microcomputer. In other words, the cylinder identifying means 31, the ignition control means 32, the fuel injection control means 33A and the fuel injection quantity correcting means 34 as well as the fuel increasing correcting means 35 and the enforcive interrupting means 36 incorporated in the electronic control unit 3A may be realized by a program or programs which can be executed by a microcomputer or microprocessor constituting a main part of the electronic control unit 3A. Accordingly, it is intended that such methods, program(s) and a recording medium in which the program(s) is stored are to be covered by the present invention.

Accordingly, all suitable modifications and equivalents may be resorted to, falling within the spirit and scope of the invention.

What is claimed is:

1. A fuel injection control system for an internal combustion engine, comprising:

a crank angle sensor for generating a crank angle signal indicative of rotational positions of said engine;

a variety of sensors for detecting operating states of said engine;

fuel injectors for injecting a demanded quantity of fuel into a plurality of cylinders of said engine;

cylinder identifying means for identifying each of said engine cylinders on the basis of said crank angle signal to thereby generate a cylinder identifying signal; and fuel injection control means for driving said fuel injectors of said engine cylinders, respectively, in dependence on said crank angle signal, said engine operating states and said cylinder identifying signal, wherein said fuel injection control means is so designed as to inject the fuel simultaneously only for the engine cylinders which are not in the suction stroke after generation of said cylinder identifying signal while setting driving time durations of said fuel injectors on the basis of said demanded fuel quantity Fs and the number N of said cylinders so that a basic fuel quantity Fb per injection for each of said engine cylinders can meet the condition that Fb=Fs/(N−1).

2. A fuel injection control system for an internal combustion engine according to claim 1, further comprising:

fuel injection quantity correcting means for correcting said driving time duration of said fuel injector in response to said cylinder identifying signal, wherein said fuel injection quantity correcting means includes enforcive interrupting means for limiting said driving time duration of said fuel injector so that said driving time duration does not interfere with the suction stroke of each of said individual cylinders.

3. A fuel injection control system for an internal combustion engine according to claim 2, wherein when such cylinder whose exhaust stroke overlaps at least partially with said driving time duration of said fuel injector exists, said enforcive interrupting means interrupts forcibly said driving time duration of said fuel injector for said such cylinder at a time point substantially corresponding to the ignition timing of the cylinder other than said such cylinder.

4. A fuel injection control system for an internal combustion engine according to claim 2, wherein said various sensors including at least a sensor for generating information concerning at least one of a revolution number and a temperature of said internal combustion engine, wherein said enforcive interrupting means is so designed as to set variably an interruption timing for interrupting said driving time duration of said fuel injector in dependence on said information concerning at least one of said revolution number and said temperature.

5. A fuel-injection control system for an internal combustion engine according to claim 2, wherein said enforcive interrupting means is so designed as to be validated at least in N-th or alternatively 2N-th ignition cycle after generation of said cylinder identifying signal.

6. A fuel injection control system for an internal combustion engine according to claim 2, said fuel injection quantity correcting means further including fuel increase correcting means for increasing temporarily the fuel injection quantity, wherein said fuel increasing correcting means is so designed as to set only a first shot of fuel injection quantity to be about (N−1) multiple of said basic fuel injection quantity only for the engine cylinder whose exhaust stroke overlaps with the first fuel injection time point after generation of said cylinder identifying signal.

7. A fuel injection control system for an internal combustion engine according to claim 6, said various sensors including a sensor for generating information concerning at least one of a revolution number and a temperature of said internal combustion engine, wherein said fuel increase correcting means is so designed as to set variably said first shot of fuel injection quantity in dependence on the information concerning at least one of said revolution number and said temperature.

8. A fuel injection control system for an internal combustion engine according to claim 1, further comprising:

fuel injection quantity correcting means for correcting said driving time duration of said fuel injector in response to said cylinder identifying signal, wherein said fuel injection quantity correcting means includes fuel increase correcting means for increasing temporarily the fuel injection quantity, and wherein said fuel increasing correcting means is so designed as to set only a first shot of fuel injection quantity to be about (N−1) multiple of said basic fuel injection quantity only for the engine cylinder whose exhaust stroke overlaps with the first fuel injection time point after generation of said cylinder identifying signal.

9. A fuel injection control system for an internal combustion engine according to claim 8, said various sensors including a sensor for generating information concerning at least one of a revolution number and a temperature of said internal combustion engine, wherein said fuel increase correcting means is so designed as to set variably said first shot of fuel injection quantity in dependence on the information concerning at least one of said revolution number and said temperature.

10. A fuel injection control system for an internal combustion engine, comprising:

a crank angle sensor for generating a crank angle signal indicative of rotational positions of said engine;

a variety of sensors for detecting operating states of said engine;

fuel injectors for injecting a demanded quantity of fuel into a plurality of cylinders of said engine;

cylinder identifying means for identifying each of said engine cylinders on the basis of said crank angle signal to thereby generate a cylinder identifying signal;

fuel injection control means for driving said fuel injectors of said engine cylinders, respectively, in dependence on said crank angle signal, said engine operating state and said cylinder identifying signal, and fuel injection quantity correcting means for correcting said driving time duration of said fuel injectors in response to said cylinder identifying signal, wherein said fuel injection control means is so designed as to inject the fuel simultaneously for said engine cylinders after generation of said cylinder identifying signal while setting driving time durations of said fuel injectors on the basis of said demanded fuel quantity Fs and the number N of said cylinders so that a basic fuel quantity Fb per injection for each of said engine cylinders can meet the condition that Fb=Fs/N, said fuel injection quantity correcting means including fuel increase correcting means for increasing temporarily the fuel injection quantity, wherein said fuel increasing correcting means is so designed as to set only a first shot of fuel injection quantity to be about (N−1) multiple of said basic fuel injection quantity only for the engine cylinder whose exhaust stroke overlaps at least partially with the first fuel injection time point after the generation of said cylinder identifying signal.

11. A fuel injection control system for an internal combustion engine according to claim 10, said various sensors including a sensor for generating information concerning at least one of a revolution number and a temperature of said internal combustion engine, wherein said fuel increase correcting means is so designed as to set variably said first shot of fuel injection quantity in dependence on the information concerning at least one of said revolution number and said temperature.

12. A method of controlling fuel injection for an internal combustion engine having a plurality of engine cylinders, comprising the steps of:

generating a crank angle signal indicative of rotational positions of said engine;

detecting operating states of said engine;

injecting a demanded quantity of fuel into a plurality of cylinders of said engine;

identifying each of said engine cylinders on the basis of said crank angle signal to thereby generate a cylinder identifying signal; and driving fuel injectors of said cylinders, respectively, in dependence on said crank angle signal, said engine operating states and said cylinder identifying signal, wherein fuel is injected simultaneously only for the engine cylinders which are not in the suction stroke after the generation of said cylinder identifying signal while setting driving time durations of said fuel injectors on the basis of said demanded fuel quantity Fs and the number N of said cylinders so that a basic fuel quantity Fb per injection for each of said engine cylinders can meet the condition that $Fb=Fs/(N-1)$.

* * * * *